Nov. 25, 1969  J. A. PATTERSON  3,479,864
ANALYTICAL METHOD AND FREE ENERGY MEASURING APPARATUS
Filed April 11, 1968
FIG_1
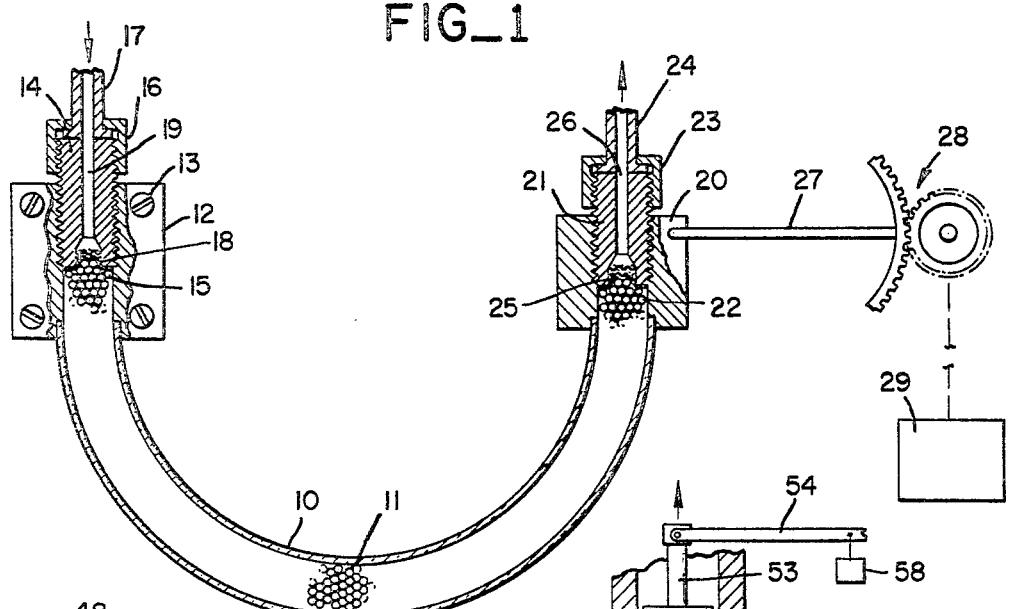
FIG_2
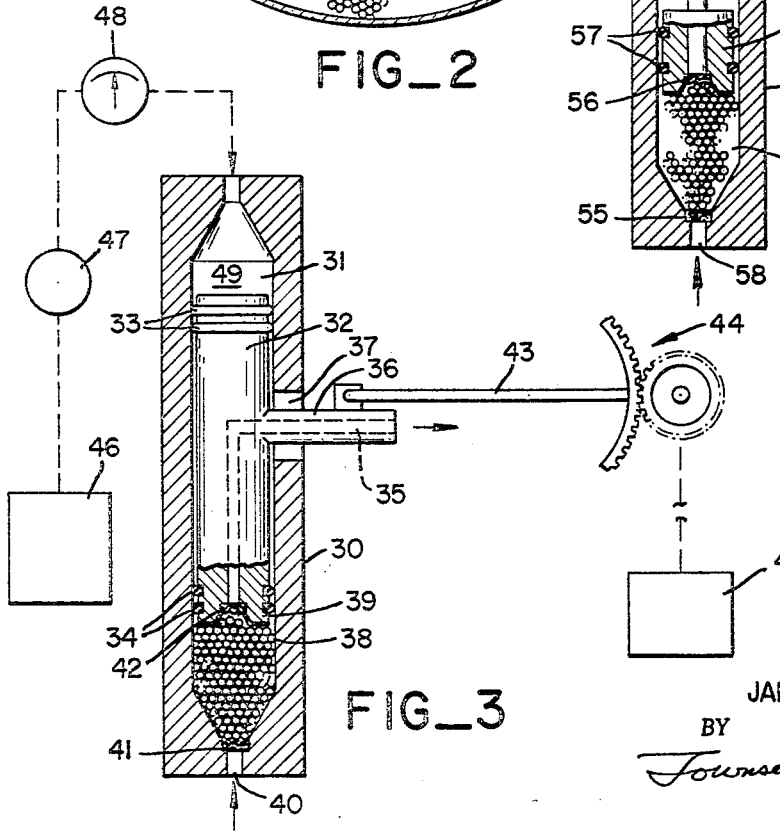
FIG_3
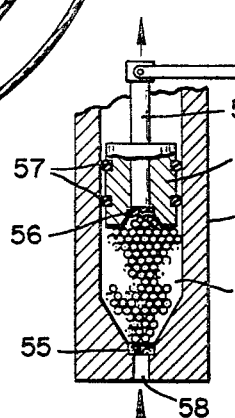
FIG_4
INVENTOR.
JAMES A. PATTERSON
BY
Townsend and Townsend
ATTORNEYS United States Patent Office 3,479,864
Patented Nov. 25, 1969

3,479,864
ANALYTICAL METHOD AND FREE ENERGY
MEASURING APPARATUS
James A. Patterson, 727 Viola Place,
Los Altos, Calif. 94022
Continuation-in-part of application Ser. No. 540,317,
Apr. 5, 1966. This application Apr. 11, 1968, Ser.
No. 721,564
Int. Cl. G01n 11/10
U.S. Cl. 73—64.3
28 Claims

ABSTRACT OF THE DISCLOSURE

Free energy of a fluid is determined relative to that of other fluids by swelling or contracting a symmetrical particle having a molecular lattice that is insoluble in the fluids causing the swelling and contracting. Particles formed from a cross-linked organic resin such as a styrene-divinyl benzene copolymer are preferred. Change in particle volume at constant pressure or change in pressure at constant volume of the particle upon contact with fluid is directly proportional to free energy of fluid relative to a standard fluid used with the same particles.

---

This application is a continuation-in-part of copending patent application Ser. No. 540,317 filed Apr. 5, 1966, now abandoned.

This invention relates to a method and apparatus for obtaining a measurement proportional to the free energy of a fluid relative to other fluids. The term "fluid" is used herein to include both gases and liquids. In one application of the invention, osmotic pressure of fluids can be determined by reference to a standard.

In essence, the invention provides a technique for non-destructively measuring the activity of aqueous or non-aqueous fluids. In one embodiment this is accomplished by measuring the induced solid stress on a packed bed of suitable particles such as synthetic polymers of the type that are sensitive to the fluid in terms of solvation and swelling or contracting in relation to the activity of the fluid but which are not soluble in the particular fluid of concern.

The swelling of suitable particles of the type used herein, for example cross-linked copolymers such as those formed from polystyrene and divinyl benzene, is known and has previously been reported in the literature. The invention here is based upon the discovery that the change, or tendency to change, in dimensions of the selected particles under solvating conditions is a quantitative expression of solvent free energy of the solvent or fluid system. By measuring these dimensional changes, for example by one of several mechanical techniques to be described, data proportional to the free energy change in the system is obtained. By obtaining similar data from a standard solvent or fluid system in the same environment, absolute values can be readily calculated. As will be clear, if the free energy change of a system is known or can be determined, all information directly proportional to such a value can also be readily calculated instead of, or in addition thereto. Thus, the invention can be readily adapted for determining such items as osmotic pressure or osmolarity of a fluid, as well as the molecular weight of solute dissolved in the fluid.

Reference is made to the accompanying drawing where:

FIG. 1 shows a schematic flow in which the present invention is used for determining osmotic pressure of a test solution.

FIG. 2 is a schematic side sectional view of one form of appartus useful in applying the present invention to the measurement of osmotic pressure.

FIG. 3 is a side sectional view, with parts broken away, illustrating an alternative embodiment for the measurement of osmotic pressure.

FIG. 4 is a side sectional view showing part of another alternative embodiment for measuring osmotic pressure in accordance with this invention.

The heart of the system used in the present invention is a fluid swellable particle formed from a molecular lattice which is employed in the form of one or more symmetrical particles. The particle(s) is preferably used in a chamber and the desired data is obtained from stress indications created in the particle(s) by the particular solvent undergoing testing. If the particle(s) is not symmetrical, geometrical packing changes during swelling and contraction can occur and stress indications observed will not be in strict proportion to the action of the solvent system. In the preferred case, therefore, particles(s) in spherical form are utilized since they best avoid this problem. The spherical particles are preferably quite small and a relatively large number can be utilized in making an efficient operating device. A single particle may serve as well or better in a suitable device.

Aside from a symmetrical configuration, and where plural particles are used, a narrow range of size distribution of the several particles, together with uniformity of the chemical and physical characteristics of the particle are significant. The particles should preferably be non-deformable under the stress created over the free energy range attendant the contemplated use. For example, some solvation stresses can be as high as 3,000 atmospheres. The particles should preferably also have a uniform molecular matrix so that when a plurality are used a uniform response to the solvent (and solute which may be contained therein) is obtained.

Of critical importance in all cases, the particle should be capable of solvating in the solvent system applied during conditions of observations so that the stresses sought are created. At the same time, the particle must not dissolve in the solvent system for obvious reasons.

Preferably, the particle should respond to both negative and positive solvent free energy changes with minimum hysteresis loops and this preferably should occur at a sufficiently rapid rate in response to reasonable flow rates of the fluids being measured. Hysteresis of the polymer particles (creation of different stress patterns during swelling or contracting from use to use) would obviously produce erroneous results. In other words, when utilizing a spherical particle, changes in solvation free energy should preferably produce stresses within the particle which in turn produce only concentric expansion and contraction of the particle, and this preferably should be of consistent magnitude for the same inducement from use to use. In some instances, particles which exhibit hysteresis may be used. For example, where measurement of particle expansion only is needed, hysteresis during contraction of the particle may be unimportant. Similarly, other deviations from the preferred properties may be tolerated where some error can be tolerated. All that is essential is that the particle be swellable without dissolving in the fluid being tested.

A group of materials which substantially meet all of the preferred requirements discussed above are broadly classed as organic synthetic cross-linked resins. These materials are distinguished from linear or non-crosslinked polymers such as polyvinyl alcohol. Typical of the desired materials are those generally described in U.S. Patent No. 2,366,007 to D'Alelio. These copolymers are formed by a conventional catalyized polymerization reaction and are made from a monovinyl aryl compound such as styrene (vinyl benzene), vinyl toluenes, vinyl naphthalenes, vinyl ethyl benzenes, alpha-methyl styrene, vinyl chlorobenzenes and vinyl xylenes. The selected monomer is cross-linked with a suitable polyvinyl aryl compound, such as the divinyl benzenes, divinyl toluenes, divinyl naphthalenes, divinyl xylenes, divinyl ethyl benzenes, divinyl chlorobenzenes and divinyl-phenyl vinyl ethers. Excellent results for present purposes are obtained with particles formed from polystyrene cross-linked with divinyl benzene.

As described in the above-referenced patent and elsewhere, polymers of this type can be formed with or without fixed ionic groups sch as sulfate groups attached to the polymer matrix. Particles containing fixed ionic groups solvate with aqueous fluids (both liquid and gas phase) whereas polymers free from fixed ionic groups are solvated by organic fluids. Therefore, when the test fluid is aqueous based, a polymer containing a fixed ionic group is employed whereas a polymer free from such ionic groups is employed when the test fluid is an organic solvent.

Examples of another group of useful cross-linked synthetic resins are those metal chelate forming resins such as those disclosed in U.S. Patent No. 2,980,607 to R. A. Mock et al. The referenced patents are merely exemplary of the cross-linked synthetic resins which can be employed in the particles.

Aside from the preferred cross-linked synthetic organic resins, the method and apparatus of this invention contemplate the use of all particles which have a molecular lattice that is swellable but not soluble in the fluid being processed. In the broadest aspects of the invention, the particle may be derived from inorganic materials as well as the organic materials noted above. Examples of inorganic materials include silica gel which may be obtained in a spherical particulate form. See "Proc. Symposium Colston Research Society No. 10," p. 195, 1958 by A. V. Kiselev. Other inorganic materials include swellable clay ion exchangers such as bentonite and the montmorillonites. Inorganic ion exchangers such as the aluminas and hydroxylapatite are also useful and have the advantage of being available in a spherical form. Other useful inorganic particles comprise tungstic oxide and ferric oxide. While these materials are not spherical, they have reasonably good uniformity of geometry, the former particles being rod-like and the latter plate-like. Still other useful inorganic particles are included within the category of crystalline ion exchangers such as zirconium phosphate, zirconium tungstate, zirconium molybdate and hydrous zirconium oxide.

It will be appreciated that all of the potential useful particles, especially the inorganics, are not insoluble in all fluids. Accordingly, the particle should be selected with the nature of fluid being tested in mind.

The application of the measurement of solvent free energy is conveniently illustrated in connection with the determination of osmotic pressure. With reference to FIG. 1 of the drawing, the general flow for practicing the present method using novel apparatus contemplates the input of a solution to be analyzed to a pump or a similar device for creating a pressure on the fluid as required. Pressure is desirable in most practical applications since a significant pressure drop will occur in flowing the fluid through the relatively tightly packed bed of polymer particles. The fluid under pressure is then passed through a device such as that to be described in connection with FIGS. 2, 3 and 4 where the fluid solvates the particles contained in the apparatus and stress changes in the particles are measured. The test solution is discharged from the chamber containing the polymer particles. At this point the fluid can be used in any way desired, because the test fluid is in no way significantly changed by the procedure. It is therefore suitable for further testing and analysis.

In FIG. 2, a Bourdon type tube 10 is filled with a plurality of spherical beads 11 formed, for example, by cross-linking styrene with divinyl benzene. The beads are available from Microspheres, Inc. of Palo Alto, Calif. under the trade Micule. The beads 11 are of substantially uniform diameters throughout tube 10 and are relatively closely packed to completely fill the tube and leave substantially no room for movement relative to each other.

At the left hand side of the figure, a stationary mounting bracket 12 can be affixed to any suitable surface and attached thereto by screws 13. A threaded inlet plug 14 is engaged with mounting 12 until it abuts with the inlet end 15 of tube 10. A connector 16 is threadably engaged with plug 14 to connect the apparatus with a conduit 17. Conduit 17 may be in communication with a source of test fluid and may include a pump or other pressure feeding device as noted above. A porous retainer screen and ring assembly 18 is interposed between the inlet end 15 of tube 10 and inlet channel 19 of plug 14. The screen of assembly 18 permits input of test solution while preventing polymer beads 11 from backing up into channel 19 during swelling of the beads by test fluid.

At the right hand side of FIG. 2, tube 10 terminates in a free floating mounting 20. A plug 21 is threadably connected therein to abut with the discharge end 22 of tube 10. Mounting 20 may be suitably connected by means of a connector ring 23 to a discharge conduit 24 in a manner similar to that shown with respect to the input end of the tube. As before, a retainer screen and ring assembly 25 is inserted between discharge end 22 of tube 10 and discharge conduit 26 of plug 21 to prevent movement of beads 11 out of tube 10. Floating mounting 20 is connected to arm 27 and gear train 28. Movement of mounting 20 is translated through arm 27 and gear train 28 to any suitable electronic component or mechanical device such as an analytical balance represented by block 29.

In use, when fluid is flowed through tube 10 and outwardly through discharge conduit 26, beads 11 will tend to swell or contract in relation to the change in free energy of the fluid. For example, if beads 11 are of the styrene-divinyl benzene type and contain a fixed ionic group such as a sulfate group, the fluid introduced is suitably aqueous in nature. If the aqueous fluid contains dissolved salts or other molecular species, the free energy of the fluid is decreased. Contact with the beads will result in an outflow of water from the beads (assuming that the beads had been solvated with water before introduction of the test fluid). The beads thereby are contracted and a decrease in stress on tube 10 will result. Arm 27 will be pulled upwardly with the amount of movement being observable on the instrument represented by block 29.

If water containing a decreased amount of dissolved salts or molecular species is then passed through the apparatus, its increased free energy content will have an opposite effect. Upon contact with beads 11 water will pass into the spherical polymers from the interparticle spaces which will thereby increase the internal water content of the beads. A hydration or solvation stress (pressure per unit area of bead surface) is caused by the increase in internal water and this pressure will be transmitted from bead to bead (assuming that the beads are sufficiently uniform in size and chemical composition) until all of the solvation stress is finally applied to the walls of tube 10. The pressure will cause tube 10 to move so that arm 27 is moved downwardly and again the change will be observable on the instrument represented by block 29.

In view of the above action of the beads upon contact with solvent containing greater and lesser concentrations of dissolved species, the description of the system and its function can be appreciated by regarding the beads as a "solid semi-permeable membrane." In this way, it is analogous to the membranes conventionally utilized for measurement of osmotic pressure of fluid.

In accordance with the present discovery, the amount of movement observable at block 29 is directly proportional to the change in free energy content of the fluid. Therefore, if a standard of known activity is processed through the instrument and the read out component of block 29 calibrated therewith, values for free energy of an unknown are readily obtainable. In addition, osmotic pressure, for example, which is directly proportional to the free energy information, can be readily calculated by reference to the osmotic pressure of a standard processed by the device.

The apparatus of FIG. 2 is designed to operate under constant pressure by sensing the volume changes that occur upon passage of the test fluid through the bead bed. The apparatus illustrated in FIG. 3 is designed to operate at constant volume by measuring positive and negative pressure changes applied to the bead bed needed to maintain or reattain the initial bead volume following contact with the test fluid. As such it includes a housing 30 defining a chamber 31 therein. A double ended piston 32 is inserted for movement up and down within chamber 31 and has pairs of substantially friction-free O-ring seals 33 and 34 at the opposite ends thereof. Piston 32 is made with a right angle channel 35 therethrough with an arm 36 normal to the main portion of piston 32 extending through an aperture 37 in housing 30. Aperture 37 is larger than the diameter of arm 36 so that up and down movement of piston 32 is permitted.

A plurality of cross-linked polymeric beads 38 are positioned in the lower end of chamber 31 between the bottom of piston 32 and inlet channel 40 of housing 30. As before, the beads are maintained in position between a pair of retention screens 41 and 42. Test fluid enters at inlet conduit 40 through screen 41, proceeds through the bead bed and thence out through right angle channel 35, as shown by the arrows. Again, a read out arm 43 is attached to arm 36 and includes a gear train 44 for translating the movement and transmitting it to a suitable read out component schematically illustrated by block 45.

The constant volume system of FIG. 3 includes a source of pressure 46, a valve 47, and a pressure gauge 48. In operation the unit is placed under pressure by opening valve 47 and permitting air to enter the top of chamber 31 to occupy area 49 and work against the top of piston 32. At the same time fluid (for example water containing no solute) is introduced at inlet conduit 40 and passed through the bead bed. At this point the reading at block 45 is noted and may be considered a zero point. Then a test liquid containing solute is introduced at inlet conduit 40 and flowed through the bed of beads. If the osmolarity of the test liquid is less than the pure base liquid, the resin will attempt to expand and push piston 32 upwardly. If additional pressure is introduced through valve 47, piston 32 can be moved back downwardly so that the deflection is nullified and the unit is returned to the zero point obtained with the pure base liquid. The increase in pressure required to maintain the constant volume, which can be read at gauge 48, is directly proportional to the differential osmolarity or free energy of the base liquid and the test liquid.

FIG. 4 illustrates an alternative embodiment for measuring change in free energy by the constant pressure-change in volume technique illustrated in FIG. 2. In this case, instead of a Bourdon type tube, a housing 50 defining a polymer bead chamber 51 therein is utilized. A piston 52 joined with a hollow connecting rod 53 and read out arm 54 is inserted within housing 50 above the beads. Again, a pair of retainer screens 55 and 56 maintains the beads within the area desired. A seal around piston 52 is secured with substantially friction free sealing rings 57. Test fluid is introduced at entrance 58 for passage through the beads and outwardly through hollow connecting arm 53 in the direction of the arrows. Swelling and contraction of the beads causes up and down movement of piston 52 which is translated through arm 54 to a suitable read out system as before. In this case, however, a weight 58 is applied to arm 54 which tends to keep the piston 52 in contact with the bead bed. Expansion in volume of the beads works against the weight force. When the beads contract the weight force tends to move the piston downwardly to the extent permitted by the reduced volume of the bead bed.

With any of the above types of apparatus, it has been demonstrated that a change of osmotic pressure created by a salt concentration of $3.41 \times 10^{-9}$ moles/liter can be quantitatively determined with a response period of only five seconds. Such levels of sensitivity have never before been approached. For example, with the commonly used freezing point depression techniques now in use a sodium chloride salt concentration of $2.18 \times 10^{-2}$ moles/liter represents a practical limit of detection. Response time is not comparable since the technique relies upon freezing point depression. Consequently, the present technique attains in a continuous system having a five second response—an improvement factor of $10^7$.

The present invention provides many other advantages and applications not possible with existing technology. Thus, the present principle of detecting the activity of the water or other solvent is independent with respect to secondary effects from such factors as temperature, barometric pressure, media viscosity, media interfacial tension, combination or mixture of solvated molecules or ions, flow pressure, mixing of media, and size of the test chamber. Compared with existing osmometers, the present apparatus is substantially simplified. It utilizes a direct measurement on the solvent phases and does not function by way of an indirect technique such as a freezing point depression. Tests can be accomplished extremely rapidly without destroying the sample.

Measurement of osmolarity without sample change or change in state as by freezing or boiling is of particular advantage in measuring osmolarity of blood. If blood is frozen or boiled, the red blood cells can be destroyed which thereby adds soluble material to the plasma and change the osmolar character of the blood, leading to inaccurate determinations.

Aside from advantageous application to measurement of osmolarity of blood, the present principle of osmotic measurement can be extended to other body fluids and for analytical work in allied fields. The continuous rapid response rate of the unit lends itself to use in combination with automatic controls for water softening processes, water deionization, and purification processes to give but a few of the areas opened up by this new concept.

Although the foregoing invention has been described in some detail by way of illustration and example for purposes of clarity of understanding, it is understood that certain changes and modifications may be practiced within the spirit and scope of the invention.

What is claimed is:

1. A method for obtaining a measurement proportional to the free energy of a fluid relative to other fluids comprising: providing a chamber containing at least one particle having a molecular lattice that is swellable but not soluble in said fluid; initially determining the volume occupied by the particle(s); contacting the particle(s) with said fluid to swell or contract the particle(s) in relation to the activity of the fluid; and measuring change in the volume caused by the fluid, said change in volume being directly proportional to the free energy of the fluid relative to other fluids.

2. A method for obtaining a measurement proportional to the free energy of a fluid relative to the free energy of other fluids in accordance with claim 1 wherein said particle(s) are symmetrical and said measuring of the change in particle volume is executed while maintaining a constant pressure.

3. A method in accordance with claim 2 wherein said particle(s) are spherical and formed from a substantially hysteresis-free cross-linked polymer.

4. A method in accordance with claim 3 wherein said polymer is a cross-linked copolymer of a polyvinyl aryl compound and a monovinyl aryl compound.

5. A method in accordance with claim 4 wherein said copolymer is formed from divinyl benzene and styrene.

6. A method in accordance with claim 3 wherein said polymer contains fixed ionic groups and the fluid is water.

7. A method in accordance with claim 3 wherein said polymer is free from fixed ionic groups and the fluid is an organic liquid.

8. A method in accordance with claim 1 and including the steps of contacting said particle(s) with fluid substantially free from solute prior to the initial determination of volume in an amount sufficient to eliminate the effect of any previously used fluids and solutes.

9. A method in accordance with claim 1 wherein said fluid contains solute and constitutes an unknown entity, and including steps of comparing the measured change in volume of the unknown solute-containing fluid with the change in volume of a known fluid in the same environment to determine information about the unknown fluid that is proportional to the free energy thereof.

10. A method for obtaining a measurement proportional to the free energy of a fluid relative to other fluids comprising: providing a chamber containing at least one particle having a molecular lattice that is swellable but not soluble in said fluid; initially determining the pressure of the particle(s) relative to the interior surfaces of the chamber; contacting the particle(s) with said fluid to swell or contract the particle(s) in relation to the activity of the fluid; and measuring change in said pressure caused by the fluid, the change in pressure being directly proportional to the free energy of the fluid relative to other fluids.

11. A method for obtaining a measurement proportional to the free energy of a fluid relative to the free energy of other fluids in accordance with claim 10 wherein said particle(s) are symmetrical and said measuring of the change in pressure is executed while maintaining a constant volume.

12. A method in accordance with claim 11 wherein said particle(s) are spherical and formed from a substantially hysteresis-free cross-linked polymer.

13. A method in accordance with claim 12 wherein said polymer is a cross-linked copolymer of a polyvinyl aryl compound and a monovinyl aryl compound.

14. A method in accordance with claim 13 wherein said copolymer is formed from divinyl benzene and styrene.

15. A method in accordance with claim 12 wherein said polyemr contains fixed ionic groups and the fluid is water.

16. A method in accordance with claim 12 wherein said polymer is free from fixed ionic groups and said fluid is an organic liquid.

17. A method in accordance with claim 10 and including the steps of contacting said particle(s) with fluid substantially free from solute prior to the initial determination of pressure in an amount sufficient to eliminate the effect of any previously used fluids and solutes.

18. A method in accordance with claim 10 wherein said fluid contains solute and constitutes an unknown entity, and including the steps of comparing the measured change in pressure of the unknown solute-containing fluid with the change in pressure of a known fluid in the same environment to determine information about the unknown fluid that is proportional to the free energy thereof.

19. Apparatus for obtaining a measurement proportional to change in the free energy of a fluid comprising: a chamber containing at least one particle having a molecular lattice that is swellable but not soluble in said fluid; inlet and outlet means communicating with said chamber for flowing fluid into and out of contact with said particle(s); and means for measuring changes in volume of said particle(s) at constant pressure caused by solvating said particle(s) with said fluid.

20. Apparatus in accordance with claim 19 wherein said chamber contains at least one spherical particle formed from a cross-linked copolymer.

21. Apparatus in accordance with claim 20 wherein said copolymer is formed from divinyl benzene and styrene.

22. Apparatus in accordance with claim 19 wherein said means for measuring changes caused by solvating said particle(s) comprises: a chamber open to the atmosphere for maintaining constant pressure therein; said chamber and particle(s) selected so that the particle(s) substantially fill said chamber; said chamber including a movable member in contact with the surface of the particle(s); said movable member being adapted to move while remaining in contact with said particle(s) as they swell or contract when contacted with a solvating fluid.

23. Apparatus in accordance with claim 22 wherein said chamber is cylindrical and said movable member functions as a piston within said chamber.

24. Apparatus for obtaining a measurement proportional to change in the free energy of a fluid comprising: a chamber containing at least one particle having a molecular lattice that is swellable but not soluble in said fluid; inlet and outlet means communicating with said chamber for flowing fluid into and out of contact with said particle(s); and means for measuring changes in pressure of said particle(s) relative to the internal surfaces of said chamber at constant particle volume caused by solvating said particle(s) with said fluid.

25. Apparatus in accordance with claim 24 wherein said chamber comprises a hollow Bourdon type tube and said movable member comprises a floating retention head on one end of said Bourdon type tube.

26. Apparatus in accordance with claim 24 wherein said means for measuring changes caused by solvating said particle(s) comprises: a chamber having movable member forming two compartments in the chamber, said particle(s) filling the first of said compartments and a source of gas under controlled pressure being connected to the second of said compartments; swelling and contracting of said particle(s) tending to move said movable member which in turn tends to compress or expand, respectively, the gas in said second compartment, whereby the amount of positive or negative pressure required in said second compartment to readjust said first compartment to its starting volume is proportional to the change in free energy of the fluid which solvates said particle(s).

27. Apparatus in accordance with claim 24 wherein said chamber contains at least one spherical particle formed from a cross-linked copolymer.

28. Apparatus in accordance with claim 27 wherein said copolymer is formed from divinyl benzene and styrene.

References Cited

UNITED STATES PATENTS

| | | | |
|---|---|---|---|
| 1,958,813 | 5/1934 | Bristol | 73—337 |
| 2,716,886 | 9/1955 | Rowe | 73—53 |

FOREIGN PATENTS 213,930  3/1958  Australia.

LOUIS R. PRINCE, Primary Examiner

J. W. ROSKOS, Assistant Examiner

U.S. Cl. X.R.

73—337, 411